Dec. 2, 1958  F. W. DE JAHN  2,862,808
APPARATUS AND METHOD FOR REDUCING IRON OXIDE PELLETS
Filed July 31, 1957
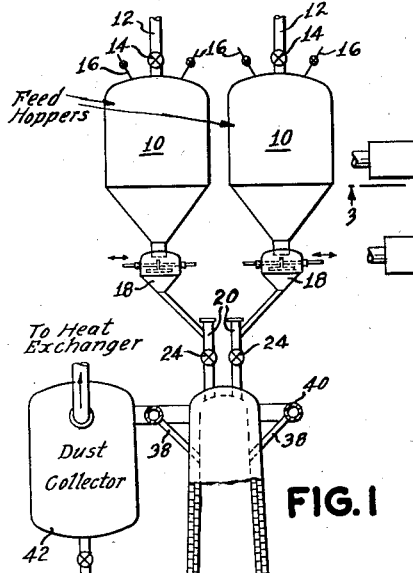
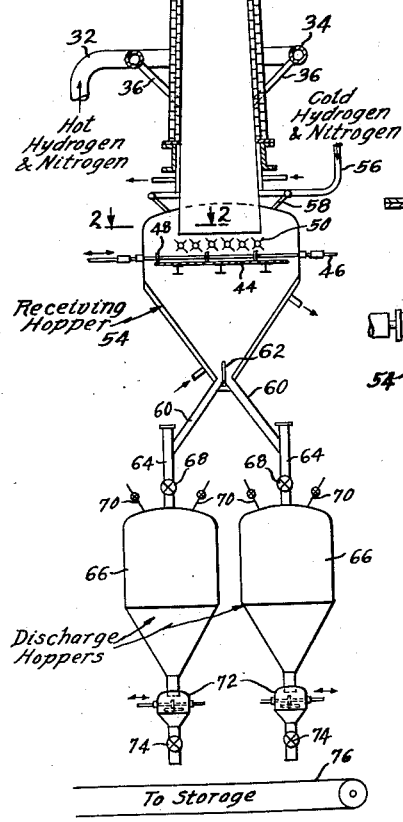
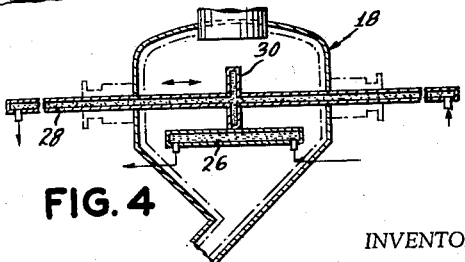
INVENTOR.
FREDRIK W. DE JAHN
BY
ATTORNEYS

United States Patent Office 2,862,808
Patented Dec. 2, 1958

2,862,808

APPARATUS AND METHOD FOR REDUCING IRON OXIDE PELLETS

Fredrik W. de Jahn, Scarsdale, N. Y., assignor of one-half to Alan N. Mann, Scarsdale, N. Y.

Application July 31, 1957, Serial No. 675,297

4 Claims. (Cl. 75—34)

It is well recognized that iron oxide such as iron ore, mill-scale or the like may be reduced with hydrogen to produce metallic iron. Despite the fact that there is a tremendous need for such a product to replace scrap in steel manufacture (or for direct utilization in steel furnaces), and while pilot plant attempts have been made to carry on such a process, it remains the fact that no operations of this type on a full commercial scale are today in use, certainly not in the United States.

A primary difficulty with the situation arises from the fact that if reduction is carried on at high temperatures, the ore particles will sinter and stick together so that they cannot be passed continuously through a furnace. If the temperature is lowered, the efficiency of the operation is greatly reduced making it necessary to handle the oxide in very fine form. On the other hand, the fineness of the product tends to increase the tendency to agglomerate and sinter and so partly destroys the beneficial effect of the low temperature. Even more, the ore reduced at low temperatures under usual conditions is highly pyrophoric and demands special and expensive treatment before it can be handled in ordinary commerce.

In accordance with the present invention, I form the iron oxide into porous globules or pellets which may range in size from approximately ½ inch to about 2 inches in diameter. A preferred size is about 1 inch to 1½ inches. These pellets are passed downward through a shaft furnace, with the reducing gas passing upward. This reducing gas comprises a mixture of hydrogen and nitrogen and the gas is under very substantial pressure ranging between 25 and 400 pounds per square inch. This pressure cooperates with the pores in the nodules to cause the gas to enter the nodules so that reduction is taking place inside as well as outside. This is important in order that the pellets may be fully reduced.

Also it is my belief that the use of the high pressure in conjunction with the presence of nitrogen assists in eliminating the pyrophoric tendencies of the reduced material. Apparently under the conditions which I have present the iron oxide acts as a catalyst to cause the formation of traces of ammonia (which can be smelled in the outlet gas) and it is the fact that if ammonia is found it must involve some nitriding effect on the surfaces of the pellets. This effect may be extremely minute, but I believe that it is sufficient to slow down or eliminate re-oxidation of the pellets on subsequent exposure to air. I have found that pellets made by my process can be kept indefinitely in open containers without showing any appreciable reoxidation.

It is a further feature of my invention that not only is the heat of reaction (as well as much of the heat used for bringing the iron ore up to the desired temperature) supplied by the stream of reducing gas but also this same stream of reducing gas is introduced into the furnace at two points, and not only is it used for heating the pellets, but it is also used for cooling them. In other words, the pellets move down through the shaft below the point where the hot gases are introduced, and then continue their downward course through cooling gases. These gases remove the heat from the pellets and are themselves heated up so that by the time they blend with the hot gases, their temperature is high enough to cause relatively little loss in efficiency.

By having the pellets positively cooled in this manner while they are still in the furnace, they can be brought down to a temperature where they can be conveniently handled and also to a temperature low enough so that mechanical apparatus may be utilized for agitating the pellets sufficiently so that they will be separated and can readily be discharged from the furnace at controllable rates. Without mechanical agitation there is an undue risk that the furnace will clog up, and mechanical agitation is not commercially feasible if applied to pellets at the relatively high temperatures used for reduction.

As regards the temperature of reduction, I have found that this should be at least as high as 1300° F. and it is extremely dangerous (as causing sintering) to have it exceed 1600° F.

By using a gas mixture containing about 20% of nitrogen and 80% of hydrogen (ordinarily with small traces of water vapor present) and a pressure of at least 25 pounds I have found that a reaction temperature of about 1470° F. can be obtained by preheating the gas mixture to 1560° F. which is about the maximum permissible. If the nitrogen content is increased somewhat, say to about 30%, the gas temperature can be reduced a little, say about 15° to 20° F. and still keep the desired reaction temperature of 1470° F. The nitrogen should fall within the range of between 15% and 35%.

The preheating of the gas mixture can be carried out in any desired way and I believe that it is now possible to heat gases to this temperature in heat exchangers using heat-resistant alloys. If such alloys are not available, the desired temperature can be obtained by burning a small amount of oxygen in the mass of hydrogen so that a small proportion of the hydrogen is consumed and the residue is exposed to the direct effect of the flame.

It is an important feature of my invention that the pellets are treated continuously with a mixture of hydrogen and nitrogen at high temperatures, and under a pressure substantially above atmospheric. It must be borne in mind that the pellets used are substantially abrasive and it is commercially impracticable to handle these in ordinary equipment so as to have continuous feed with maintenance of pressure. The particular equipment for doing this is a part of my invention.

This equipment consists primarily of two or more feed hoppers each equipped with positively operating feed mechanism and also provided with means for flushing out air with a neutral gas and with valves for controlling the flow of the nitrogen-hydrogen mixture into and out of the receiving hoppers.

The pellets to be treated, which previously have been superheated, are passed into one of these hoppers while the hopper is disconnected from the shaft furnace by one of the valves which is quite independent of the feed mechanism for the pellets. At this time the feed mechanism is turned off.

When the receiving hopper is filled, the inflow of pellets is stopped, the inlet valve is closed and the pellets are flushed out with a neutral gas and the flushing valves are tightly closed. Then, still without turning on the feed mechanism, the valve is opened which permits the hot hydrogen-nitrogen mixture to enter the receiving hopper. It is only then that the feeding mechanism is started up and operated so that the pellets fall freely into the furnace without abrading the valve which controls the gas flow.

After one receiving hopper is emptied, the feeding mechanism is stopped, the valve connecting the hopper with the furnace is closed and then the pressure in the hopper is gradually reduced, with dilution by an inert gas if desired. Finally the inlet valve is opened and again pellets can pass into the receiving hopper without abrading such valve. This is vital as this valve must be maintained hydrogen-tight.

At the outlet end of the furnace the feeding mechanism is also controllable so that the furnace may be kept full to the proper level. Again, the discharge mechanism for controlling the discharge of the pellets must be independent of the valves which control the flow of gas, and again the expedient is used of having two hoppers and again it is advisable to stop the discharge of pellets briefly while the shift is being made from one hopper to the other. Here also particular care must be taken that none of the abrasive pellet material gets into the hydrogen valves.

In the accompanying drawings I illustrate a form of device useful in carrying out my invention, in which the features of novelty are illustrated. In this drawing Fig. 1 shows a shaft furnace partly in section with the accompanying receiving and discharge hoppers, feeding mechanisms and valves;

Fig. 2 is a section line 2—2 of Fig. 1;

Fig. 3 is an enlarged detail on line 3—3 of Fig. 2, and

Fig. 4 is an enlarged detail of the feeders at the bottom of the receiving feed and discharge hoppers.

The feed hoppers are designated by the numeral 10. It is understood that these hoppers are brick-lined, as the pellets to be introduced into them will be hot. Each hopper 10 has an inlet pipe 12 provided with a valve 14. This valve 14 must be capable of holding back gas under pressure and is not to be used to control the flow of pellets into the receiving tank. The pellets are to be fed to the pipes 12 by any desired mechanism, not shown.

In addition to the pipes 12, each receiving hopper 10 is provided with a pair of vent pipes 16 by means of which an inert gas such as nitrogen or steam can be passed through the hopper.

At the bottom end each hopper 10 is provided with a feeder 18 which in turn is connected to an inlet pipe 20 of the furnace 22. The inlet pipes 20 are each provided with a valve 24 which, like the valves 14, must be capable of holding gas under pressure but should not be used for controlling the flow of pellets.

The flow of pellets out of the hoppers 10 is controlled by the feeding mechanism 18 shown in an enlarged detail in Fig. 4. This feeding mechanism comprises a plate 26 below the outlet spout of the hopper. Such plate 26 is not tight up against the bottom of the hopper but is large enough so that the pellets from the hopper will stack up on this plate and not roll over the edges by gravity. Actual feeding is done by a reciprocating rod 28 which is operated by a double-acting cylinder (not shown) and carries a rectangular rake member 30.

When the rod 28 is at rest, no pellets will pass through the feeder, but if at the same time the valve 24 connected with a given hopper is open, gas from the furnace can pass up around the plate 26, through the pellets, and into the feed hopper. Then as soon as the valve 24 is completely open and no longer liable to be injured by abrasion, feeding rod 28 can be put in motion and pellets will be knocked off the plate 26 at desired speed to fall freely into the furnace 22. In other words, I supply a feeding mechanism for the pellets which does not interfere with the flow of gas and supply valves for the control of the gas which are intended to be operated only while no pellets are passing through them.

The primary supply of hot gas for operating the furnace and reducing the oxide is supplied through the pipe 32 connected to a header 34 from which pipes 36 run into the furnace. The outlet of the gas from the furnace consists of pipes 38 running into a header 40 from which the gases are taken to a dust collector 42. As is well known, the gases are then cooled preferably in a heat exchanger. Excess water vapor and CO and $CO_2$ are removed in known manner and the gas is brought up to the desired strength by being mixed with additional hydrogen and reused. If the nitrogen builds up unduly, it may be necessary to bleed out some gas, but there will be some leakage of gas through the feeding discharge hoppers which may take care of this situation, depending on the method of operation.

The discharge of pellets from the furnace 22 is controlled by a feed mechanism somewhat similar to the mechanism in the feeders 18. This is shown in detail in Figs. 2 and 3. A plate 44 is supplied below the bottom of the furnace and spaced away from it which is large enough so that the pellets can assume their critical angle without flowing over the edge of this plate. A plurality of reciprocating rods 46 similar to the rods 28 run across plate 44 and each of these rods is provided with a plurality of rake members 48. The rake members 48 should be small enough so that they not only do not meet but there will be a clearance between them equal to something more than the diameter of a pellet. In operation, the rods 46 preferably are operated so that adjacent rods are operating in opposite directions. This not only will give a controlled feed for the pellets but it also will assist in agitating the pellets and breaking them up if they have stuck together. As before, it will be noted that this feed mechanism is for the pellets only and will not interfere with the inflow of gas.

It will be noted that the inside of the shaft furnace 22 gets slightly larger toward the bottom and there is virtually no danger that the pellets will lodge in the upper portions of the furnace. However, it is a known fact that when iron oxide is being reduced it reaches a state when about 60% of the oxygen has been eliminated where it becomes decidedly sticky. By using porous pellets so that the reduction of each pellet takes place over a fairly long period of time, this tendency to stick is greatly reduced as compared with the processes where iron oxide is used in finely divided state and treated under suspending conditions. Nevertheless, there is some tendency for the pellets to stick. I have found that they can readily be broken apart but mechanism must be supplied for that purpose.

In the present embodiment of my invention the mechanism for breaking apart the pellets (in addition to the action of the rakes 48) is supplied by the agitators 50 which are carried on shafts 52 (see Figs. 2 and 3). Ordinarily these shafts will be rotated at a speed which may, for example, be from 1 to 5 revolutions per minute or even slower. The agitators 50 and the feed plate 44 are all enclosed in a receiving hopper 54.

It is to be remembered that the pellets in the shaft furnace reach a temperature which may range up to 1560° F. At this temperature it will be virtually impossible to maintain the agitators and feed mechanism in operable condition. I meet this difficulty by supplying cold gas which should be of the same composition as the gas admitted through pipe 32 and pass the cold gas into the receiving hopper 54. In the drawing the gas is shown as admitted by pipe 56 and the distributing pipes 58. It will be noted that the agitating mechanism and feed mechanism for the pellets will not interfere with the flow of this cold gas even when the feed mechanism is stopped as the gas can flow between the pellets. I have found that if a minimum of about 15% of the gas mixture is admitted at atmospheric temperature, adequate cooling can be had to protect the feed discharge mechanism and at the same time this gas will be heated by the outgoing pellets to approximately the temperature of the incoming hot gases.

The receiving hopper 54 is connected to two discharge pipes 60 and a switch valve member 62 is provided (here shown in neutral position) which ordinarily will close the inlet to one pipe 60 while opening the inlet to the other pipe 60. The pipes 60 are connected to pipes 64 each of which is connected to a discharge hopper 66 and is supplied with a gas valve 68. These discharge hoppers, like the inlet hoppers 10, are supplied with flushing pipes 70, mechanically operated discharge feeders 72 similar to the feeders 18 and gas valves 74. Again it is to be noted that the mechanism for controlling the flow of the pellets is independent of the flow of gas and that the flow of pellets can be stopped before the gas valves are opened or closed.

It is understood that feeders 18 should be bricklined and mechanism 26, 28 and 30 water cooled as shown in Fig. 4, and it is also understood that the receiving hopper as well as the discharge hoppers should be water-jacketed so that the pellets will be continuously cooled towards the discharge in addition to the cooling effect provided by the cold gas.

The following example illustrates the operation of the device.

One of the feed hoppers 10 is shut off from the furnace by stopping the feeder mechanism 18 and closing the valve 24. Then, with the valve 14 open, preheated pellets at a temperature of about 1200° F. (between 1000° F. and 1500° F.) are introduced into the hopper in quantity sufficient substantially to fill it. The valve 14 is then closed and nitrogen is passed in and out through the vent pipes 16 to eliminate air. After the vent pipes are closed the valve 24 is opened and full pressure of the hot hydrogen-nitrogen mixture is admitted into the feed hopper. The rod 28 of the first feeder is then started in operation and the pellets are fed into the furnace. It is to be understood that when one feed hopper is connected with the furnace, the other feed hopper is cut off from the furnace and is being filled. The hoppers should be large enough so that they will hold about 2 hours' supply of pellets or more. It is inefficient to have to shift from one hopper to another too frequently. The two feed hoppers are used alternatively to maintain the furnace substantially full of pellets.

Hot gas at a temperature of about 1560° F. and under a pressure of about 150 pounds per square inch is admitted through the pipe 32, passes up through the pellets which are being reduced and then out through the header 40 to the dust collector 42. It is understood that the shaft furnace will be quite tall, certainly with a minimum height of 10 feet and preferably up to as much as 30 feet. The composition of the gas is approximately 23,100 moles of $H_2$, 6,000 moles of $N_2$ and preferably not over 900 moles of $H_2O$ for each 1,800 moles of $Fe_2O_3$ introduced into the furnace. At the same time gas of the same composition and under the same pressure but at approximately room temperature and in an amount equal to something over 15% of the hot gas is introduced through the pipe 56. This should lower the temperature of the pellets coming out of the bottom of the furnace to below 800° F. and preferably to about 600° F.

At the bottom of the furnace the agitators 50 are rotated and the rods 46 are being reciprocated to push the pellets off the plate 44. It is understood that at this time the switch valve member 62 will be closing off the movement of pellets into one of the discharge hoppers and the valve 68 to that discharge hopper will also be closed. The other discharge hopper will have its feed mechanism 72 at rest, have its valve 74 closed and its valve 68 open and this operation will continue until the discharge hopper is full. At this time the agitators 50 and the movement of the rods 46 will be stopped, the switch valve member 62 will be thrown to the other position and the valve 68 of the hopper that has just been filled will be closed. The pressure in the filled discharge hopper can then be reduced and the pellets vented by the pipes 70. Finally when the pressure is down to atmospheric the valve 74 will be opened and the contents of the hopper discharged by the feeding mechanism 72. It may, for example, fall on a belt conveyor 76 and be conveyed to storage.

When the gas that passes into the dust collector 42 is sampled it will be noticed that there is a faint smell of ammonia in the gas. This ammonia can only be produced as an incident to the nitriding of the extreme surfaces of the reduced iron of the pellets and apparently this nitriding gives great stability to the iron as the pellets not only are non-pyrophoric but are characterized by their great resistance to oxidation.

The rate of feed of the material through the furnace is controlled by the speed of movement of the rods 46 and the feeding rods 28. Normally one or the other of these will be kept at constant speed and the speed of the other adjusted to keep the furnace filled.

The time that the material remains in the furnace is not critical but usually should be at least 90 minutes and preferably longer.

It is understood that this example is given merely by way of illustration and may be modified in many particulars. Further details and discussion of the chemical phases of the process are disclosed in my copending application Serial No. 596,597, filed July 9, 1956.

What I claim is:

1. A process of reducing porous pellets of iron oxide which comprises passing such pellets downwardly through a shaft furnace in countercurrent to a hot current of reducing gas comprising hydrogen and nitrogen at a temperature of between 1300° F. and 1600° F. and at a pressure of between 25 and 400 pounds per square inch whereby the pellets are heated to a temperature of at least 1300° F. and reduced, and then without withdrawing such pellets from the shaft, continuing their downward movement through a rising zone of cold gas of like composition and pressure to the said hot gas whereby the pellets give up their heat to such gas which thereafter blends with the hot gas and the temperature of the pellets is lowered to below 800° F., then as the pellets emerge from the furnace and while still surrounded by the reducing gas, subjecting them to mechanical agitation to separate adhered pellets, and finally gradually cooling the pellets and withdrawing them from the reducing atmosphere.

2. A method of reducing porous pellets of iron oxide which comprises continuously feeding such pellets into the top of a shaft furnace operated under pressure while maintaining such pressure in the furnace, admitting into said furnace near the bottom a reducing gas mixture of hydrogen and nitrogen in the proportion of between 15% and 35% of nitrogen together with a small percentage of water vapor at a temperature of between 1300° F. and 1600° F. and at a pressure of between 25 and 400 pounds per square inch whereby the pellets are reduced and rendered resistant to atmospheric oxidation, agitating such pellets to separate adhering pellets as they emerge from the shaft while still maintaining them under pressure of the reducing gas and then withdrawing such separated pellets while still maintaining the pressure within the furnace.

3. A furnace comprising a shaft, means for feeding pellets of iron oxide into said shaft while still maintaining pressure in said shaft, means for introducing hot reducing gas under pressure into said shaft near but above the bottom of the shaft, rotary means for agitating such pellets as they come out of the shaft, means for feeding such pellets at controlled speed from the bottom of the shaft into a receiving hopper while still under pressure of the reducing gas and means for introducing cold reducing gas into the receiving hopper of like composition and pressure to the said hot reducing gas and permitting such cold gas to go up the shaft through the pellets whereby the pellets after being heated by said hot reducing gas are cooled by said cold reducing gas before contacting said rotary agitating means.

4. A structure as specified in claim 3 in which the means for feeding the pellets from the bottom of the shaft is adapted to permit the passage of cold gas into the shaft even while the movement of pellets out of the shaft is stopped.

References Cited in the file of this patent

UNITED STATES PATENTS

| | | |
|---|---|---|
| 1,541,731 | Muguet | June 9, 1925 |
| 2,509,921 | Gwynn | May 30, 1950 |
| 2,609,288 | Stuart | Sept. 2, 1952 |
| 2,805,144 | Stotler | Sept. 3, 1957 |

FOREIGN PATENTS

| | | |
|---|---|---|
| 630,122 | Great Britain | Oct. 5, 1949 |